United States Patent
Miskovic

(10) Patent No.: US 10,178,109 B1
(45) Date of Patent: Jan. 8, 2019

(54) DISCOVERY OF GROUPINGS OF SECURITY ALERT TYPES AND CORRESPONDING COMPLEX MULTIPART ATTACKS, FROM ANALYSIS OF MASSIVE SECURITY TELEMETRY

(71) Applicant: Symantec Corporation, Mountain View, CA (US)

(72) Inventor: Stanislav Miskovic, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 204 days.

(21) Appl. No.: 15/088,001

(22) Filed: Mar. 31, 2016

(51) Int. Cl.
*H04L 29/06* (2006.01)
*H04L 12/26* (2006.01)

(52) U.S. Cl.
CPC ...... *H04L 63/1416* (2013.01); *H04L 63/1441* (2013.01); *H04L 43/00* (2013.01); *H04L 63/14* (2013.01); *H04L 63/145* (2013.01); *H04L 63/1408* (2013.01); *H04L 63/1425* (2013.01); *H04L 63/1433* (2013.01); *H04L 63/306* (2013.01)

(58) Field of Classification Search
CPC ..... H04L 43/00; H04L 63/14; H04L 63/1425; H04L 63/1433; H04L 63/1441; H04L 63/145; H04L 63/1408; H04L 63/306; H04L 29/06; H04L 12/26
See application file for complete search history.

(56) References Cited

U.S. PATENT DOCUMENTS

| | | | | |
|---|---|---|---|---|
| 7,356,585 | B1* | 4/2008 | Brook | H04L 63/1416 709/224 |
| 7,716,739 | B1 | 5/2010 | Mccorkendale | |
| 2003/0084349 | A1* | 5/2003 | Friedrichs | G06F 21/55 726/22 |
| 2009/0271863 | A1* | 10/2009 | Govindavajhala | G06F 21/577 726/23 |
| 2010/0154059 | A1* | 6/2010 | McNamee | H04L 43/00 726/23 |

(Continued)

OTHER PUBLICATIONS

Ebrahimi et al., Automatic attack scenario discovering based on a new alert correlation method, 2011, IEEE.*

(Continued)

*Primary Examiner* — Jayesh M Jhaveri
(74) *Attorney, Agent, or Firm* — Patent Law Works LLP

(57) ABSTRACT

Alerts generated by triggering signatures on endpoints are identified in samples of security telemetry. The sources of alerts are filtered. Alert tuples identifying multipart attacks are discovered. An iterative multi-pass search of alert types generated by filtered sources can be conducted. During each pass, groups of successively larger numbers of alert types generated by common sources are identified. A list of alert types can be sorted according to the number of filtered sources that generated each alert type, from most to least. Pairs of alert types with multiple common sources can be identified by traversing the sorted list of alerts types. The sorted list can be iteratively traversed, identifying successive additional alert types to add to previously identified groupings, which are used as seed groups for successive identifications. Only the portion of the sorted list appearing after the last added alert type need be examined for successive identifications.

18 Claims, 7 Drawing Sheets

(56) References Cited

U.S. PATENT DOCUMENTS

| | | | | |
|---|---|---|---|---|
| 2014/0317740 | A1* | 10/2014 | Be'ery | H04L 63/14 726/23 |
| 2016/0006749 | A1* | 1/2016 | Cohen | G06Q 40/12 726/23 |
| 2016/0050224 | A1* | 2/2016 | Ricafort | H04L 61/2007 726/23 |
| 2016/0055334 | A1* | 2/2016 | Herwono | G06F 21/554 726/23 |
| 2017/0093902 | A1* | 3/2017 | Roundy | G06F 21/552 |
| 2017/0230384 | A1* | 8/2017 | Touboul | G06F 21/577 |
| 2018/0278636 | A1* | 9/2018 | Altman | H04L 63/145 |

OTHER PUBLICATIONS

Abad, C. et al., "Log Correlation for Intrusion Detection: A proof of concept," Computer Security Applications Conference, 2003, Proceedings, Dec. 8-12, 2003, 10 pages, Las Vegas, NV.

Cuppens, F. et al., "Alert Correlation in a Cooperative Intrusion Detection Framework," IEEE Symposium on Security and Privacy, May 12-15, 2002, 14 pages, Oakland, CA.

Gu, G. et al., "BotHunter: Detecting Malware Infection Through IDS-driven Dialog Correlation," 16th USENIX Security Symposium, Aug. 6-10, 2007, pp. 167-182, Boston, MA.

Ning, P. et al., "Constructing Attack Scenarios through Correlation of Intrusion Alerts," ACM Conference on Computer and Communications Security, Nov. 18-22, 2002, 10 pages, Washington D.C.

Valdes, A. et al., "Probabilistic Alert Correlation," Proceedings of the 4th International Symposium on Recent Advances in Intrusion Detection, Oct. 10-12, 2001, pp. 54-68, Davis, CA.

\* cited by examiner

DISCOVERY OF GROUPINGS OF SECURITY ALERT TYPES AND CORRESPONDING COMPLEX MULTIPART ATTACKS, FROM ANALYSIS OF MASSIVE SECURITY TELEMETRY

TECHNICAL FIELD

This disclosure pertains generally to computer security, and more specifically to discovering groupings of security alert types and corresponding complex, multipart attacks, from the analysis of massive security telemetry collected from many points of origination.

BACKGROUND

Computer security systems utilize signatures of known malicious code or activities to identify specific attacks. Commercial security system vendors maintain large collections of such signatures which are created over time based on security research and the monitoring of malicious activity across a wide base of organizations and endpoints. The triggering of an individual signature points to an individual security problem, such as java script trying to communicate with a known malicious host, a given fake antivirus advertisement, a reconnaissance of browser plugins, a suspicious port scan, a Flash presence, a network service deficiency, an operating system exploit, etc. When triggered, a signature generates a specific alert concerning the corresponding security issue.

However, contemporary complex attacks consist of multiple malicious activities, which are not detected as a unified attack through individual signature based alerting. These complex attacks can use multiple steps to probe, infect and maintain a presence on systems. Such complex multipart attacks are not described by single signatures. A single alert provides no information as what previous malicious events are likely to have occurred, or what attempted attacks are likely to follow.

Complex attacks may also have stealthy features, such as expansion of exploit trials over long time intervals in order to avoid detection. Furthermore, complex attacks do not necessarily follow any predetermined execution stage ordering. For example, an attacker using an exploit kit can try different individual exploits at different hosts at different times, thus triggering different alerts in different orders on different machines.

It would be desirable to address these issues.

SUMMARY

Groupings of security alerts identifying corresponding complex, multipart attacks are discovered, from analysis of security telemetry received from multiple points of origination. Security telemetry collected by large numbers of organizations and endpoint computers is received (e.g., periodically, continually, on demand, etc.) by a centralized computing system. Alerts generated by triggering signatures on originating computing devices are identified in given samples of the received security telemetry. The identified alerts can contain, for example, identifiers of the triggering signatures, identifiers of the invoking (attack) sources, and identifiers of the given computing devices on which the given alerts were generated. Alerts can also be identified by type. The invoking sources of identified alerts are filtered, resulting in a subset of alerts with filtered sources determined to meet at least one condition, such as having a public IP address, having generated a threshold number of alert types (or total alerts), and/or having generated alerts on a threshold number of targeted computing devices. Alert tuples identifying multipart attacks are discovered, by examining the subset of alerts with filtered sources, and identifying groupings of multiple alerts generated by at least one common filtered source.

Discovering a tuple can further take the form of identifying a grouping of alert types in the subset of alerts with filtered sources, wherein the identified grouping comprises multiple alert types generated by at least one common source. Such an identified grouping can be adjudicated to be a tuple identifying a multipart attack, and assigned a confidence level. The confidence level quantifies the assessed likelihood that the identification is accurate. Such confidence levels can be assigned to discovered tuples based on factors such as the number of alert types in the tuple, the number of common sources per alert type and/or the confidence levels in the underlying triggering signatures.

In order to discover tuples, an iterative multi-pass search of alert types generated by filtered sources can be conducted. During each pass, groups of successively larger numbers of alert types generated by at least one common source are identified. More specifically, a list of alert types generated by filtered sources can be sorted according to the number of filtered sources that generated each alert type, from most to least. Pairs of alert types with multiple common sources can be identified by traversing the sorted list of alerts types, going from most sources to least. The sorted list can be iteratively traversed, identifying successive additional alert types to add to previously identified groupings, which are used as seed groups for successive identifications. Only the portion of the sorted list appearing after the last added alert type need be examined for successive identifications, which makes for a smaller search space and hence more efficient search. In some embodiments, individual tuples can contain both alert types triggered by verified signatures and those triggered by experimental signatures. The appearance of alerts generated by experimental signatures in tuples can also be used to increase the confidence level in the experimental signatures themselves. Performing security analytics on multiple discovered tuples can also be used to identify multiple variations of the same multipart attack, and to identify multipart attacks targeting specific industries or types of organizations. Discovered alert tuples can also be provided to endpoint computing devices and organizations, where the tuples can be utilized to identify multipart attacks, predict and defend against future occurrences of components thereof, and identify previously executed components and take corresponding corrective actions.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
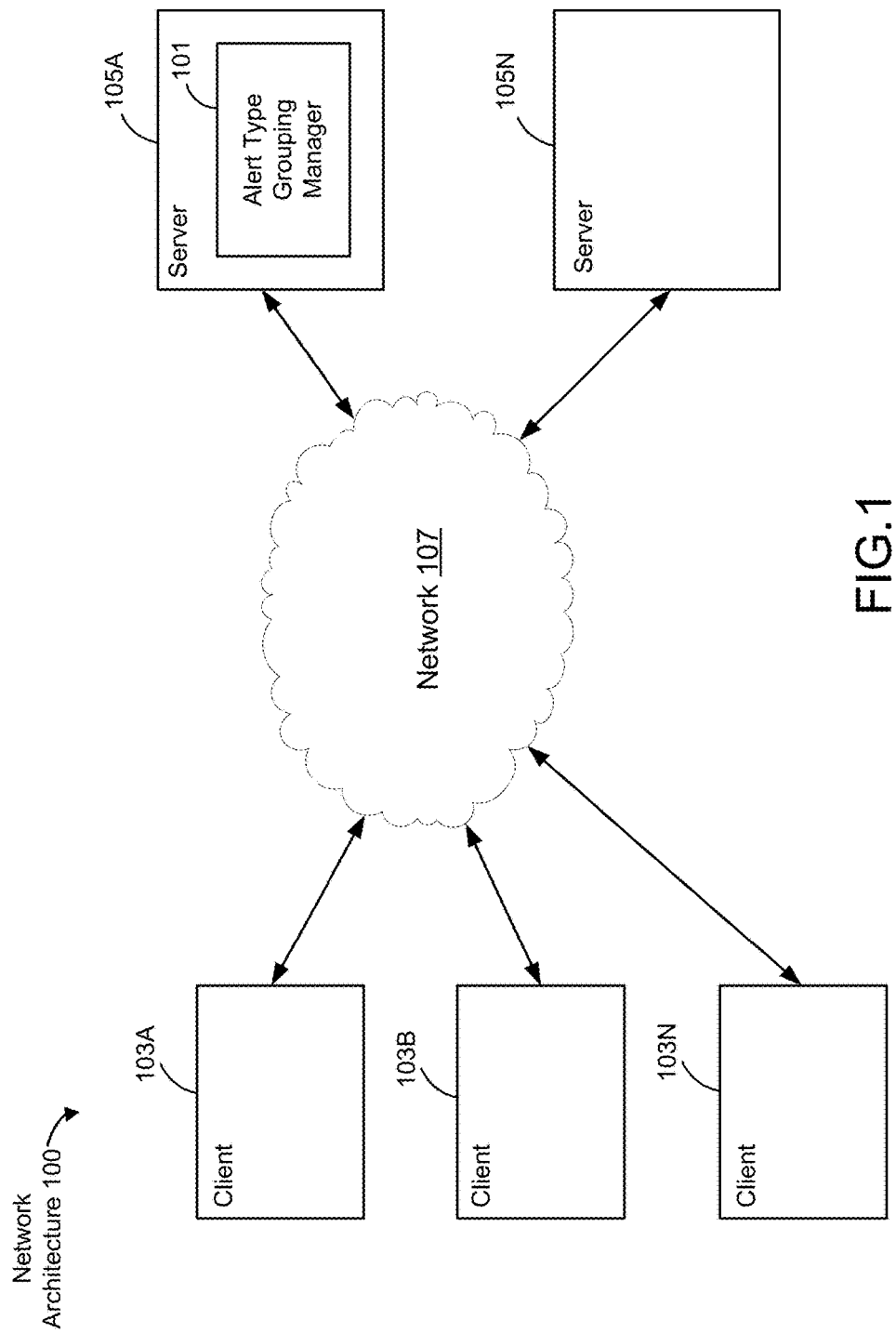
FIG. 1 is a block diagram of an exemplary network architecture in which an alert type grouping manager can be implemented, according to some embodiments.

FIG. 1 is a block diagram illustrating an exemplary network architecture 100 in which an alert type grouping manager 101 can be implemented. The illustrated network architecture 100 comprises multiple clients 103A, 103B and 103N, as well as multiple servers 105A and 105N. In FIG. 1, the alert type grouping manager 101 is illustrated as residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
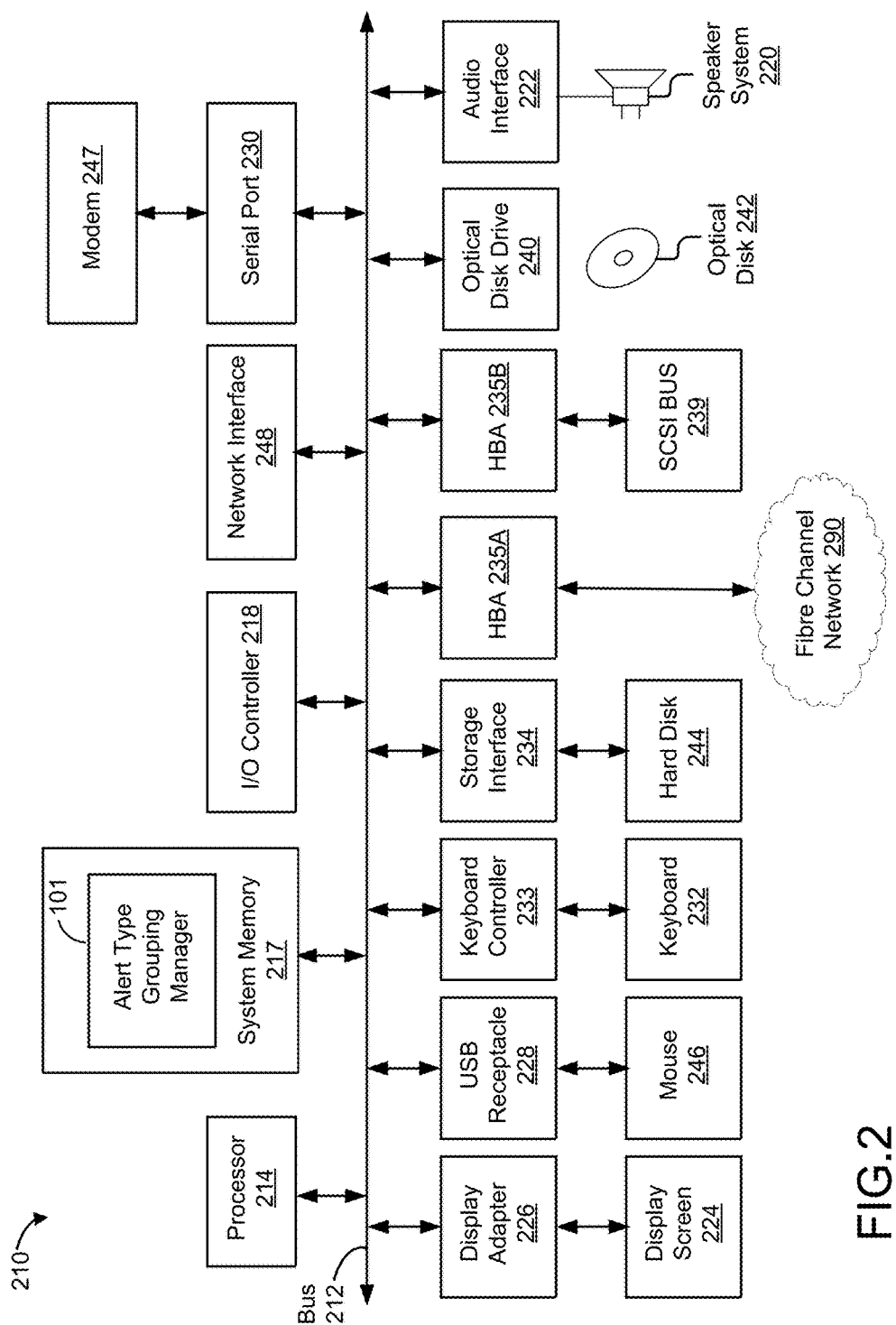
FIG. 2 is a block diagram of a computer system suitable for implementing an alert type grouping manager, according to some embodiments.

FIG. 2 is a block diagram of a computer system 210 suitable for implementing an alert type grouping manager 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the alert type grouping manager 101 is illustrated as residing in system memory 217. The workings of the alert type grouping manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
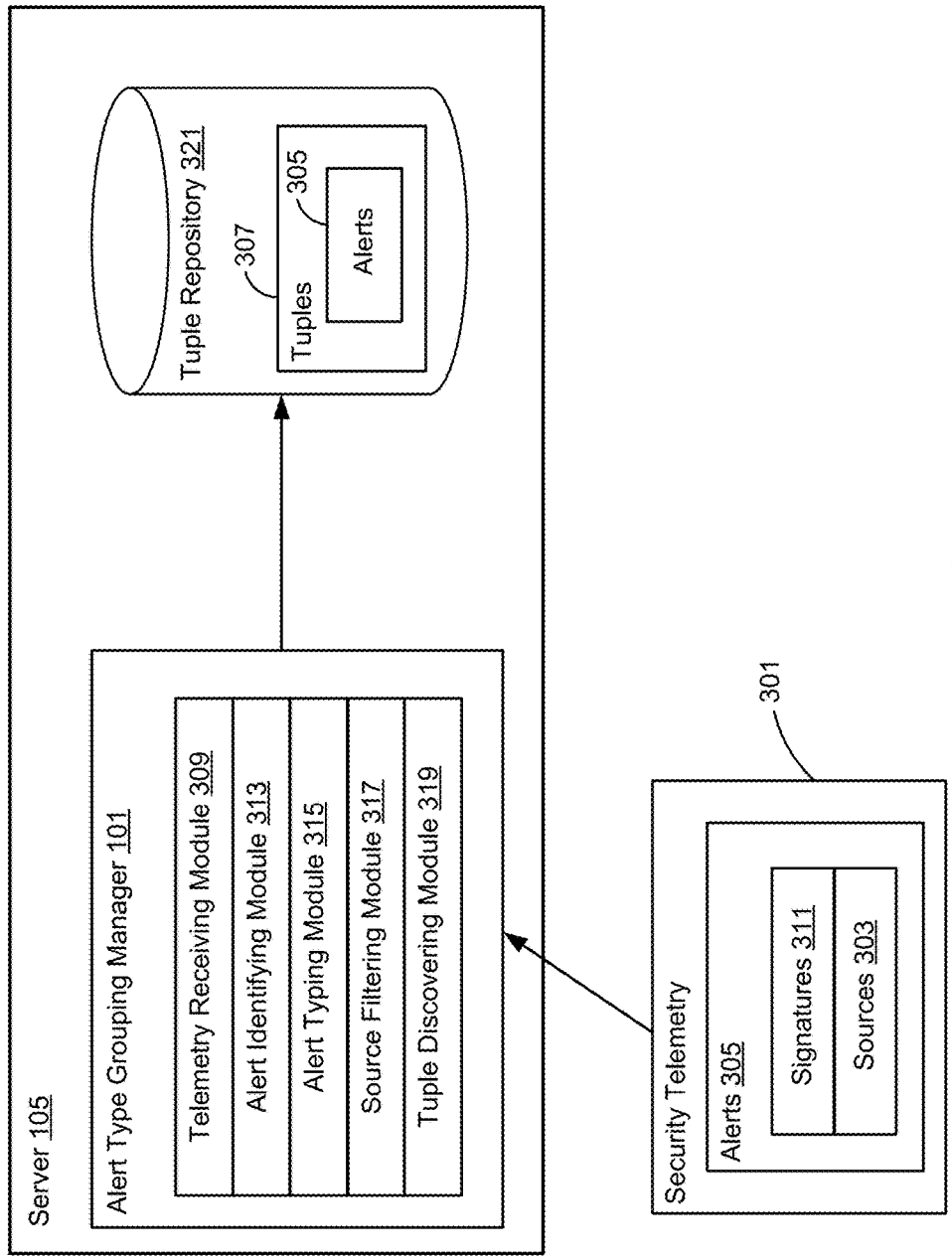
FIG. 3 is a high level block diagram of the operation of an alert type grouping manager, according to some embodiments.

FIG. 3 illustrates the operation of an alert type grouping manager 101 running on a server 105. As described above, the functionalities of the alert type grouping manager 101 can reside on specific computers 210 or be otherwise distributed between multiple computer systems 210, including within a fabric/cloud-based computing environment in which the functionality of the alert type grouping manager 101 is provided as a cloud based service over a network 107. In some embodiments, the alert type grouping manager 101 is centralized on one or more servers 105 that handle computer security for a large user base, such as a commercial security vendor, or a security division of a large organization. It is to be understood that although the alert type grouping manager 101 is illustrated in FIG. 3 as a single entity, the illustrated alert type grouping manager 101 represents a collection of functionalities, which can be instantiated as a single or multiple modules as desired (instantiation of a specific, multiple module alert type grouping manager 101 is illustrated in FIG. 3). It is to be understood that the modules of the alert type grouping manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the alert type grouping manager 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

As described in detail below, by identifying properties of alert types in analyzed security telemetry 301 and by tracking the corresponding sources 303 of the actions that triggered the alerts 305, the alert type grouping manager 101 discovers alert groupings that effectively reveal footprints of complex, multipart attacks. The triggering of alerts 305 can be observed by analyzing security telemetry 301 centrally collected (e.g., by a provider/vendor of computer security services) from a large user base. For example, different types of alerts 305 triggered on multiple endpoints and traceable to one or more common sources 303 can jointly reveal the multiple activities, resources and vulnerabilities used in combination by a specific complex attack. Such discovered alert groups are referred to herein as tuples 307. Tuples 307 comprise identified groups of alert types representative of the actions employed during complex attacks. As explained in detail below, the grouping of multiple alert types into a tuple 307 does not imply any specific ordering of the triggered alerts 305, thereby providing resilience against evasive measures taken by attackers based on varying the order of the malicious actions. As further described below, the alert type grouping manager 101 can also discover tuples 307 comprising a combination of alert types generated by triggering thoroughly verified signatures 311 (e.g., signatures 311 of known malicious code) and low-confidence or experimental signatures 311. The triggering of a low-confidence or experimental signature 311 by itself is indicative of an action that is only potentially malicious, wherein further experimentation and observation would be necessary to increase the confidence level in the individual signature 311. However, as described in detail below, a given tuple 307 containing a grouping of alert types associated with both verified and experimental signatures 311 can itself be considered verified (i.e., verified tuples 307 can contain experimental alert types). In addition, and perhaps more subtly, the appearance of an experimental signature 311 in a threshold number of tuples 307 containing a threshold metric of verified signatures 311 can be automatically adjudicated as verified, a process also described in detail below. Furthermore, the alert type grouping manager 101 can discover tuples 307 even if the based on separate attacking activities occur over long periods of time (this is described in detail below as well).

It is to be understood that the centrally collected security telemetry 301 can be received by a telemetry receiving module 309 of the alert type grouping manager 101 from a large number (e.g., hundreds, thousands, tens of thousands) of participating endpoints and organizations (not illustrated). Deployed organization and/or endpoint level security products can be set to transmit this security telemetry 301 to the centralized (e.g., cloud based) alert type grouping manager 101. The telemetry receiving module 309 can be provided with updated telemetry 301, e.g., periodically, continually or on demand, thereby maintaining current information from the various organizations. The frequency at which organizations transmit updated telemetry 301 is a variable design parameter, which can be set as desired according to different scenarios. The large base of security telemetry 301 collected from the many points or origination over time can be referred to as "massive telemetry."

The type, content and specific format of the security telemetry 301 can vary between embodiments and points of origination. Security telemetry 301 can be in the form of, for example, security system generated scanning or other assessment data, monitoring data from firewalls, network intrusion detection systems (IDS) or network intrusion prevention systems (NIPS), log data from network or other computing devices, etc.

The alert type grouping manager 101 takes security telemetry 301 as input, and analyzes the telemetry 301 in order to identify specific indications of attack grouping used for discovering the tuples 307. The telemetry 301 is generally sizeable and noisy. In this context, the alert type grouping manager 101 can analyze a given sample of security telemetry 301. In some embodiments, the telemetry 301 collected during a given period of time is analyzed as a sample, such as three days, one week, ten days, etc. In other embodiments, other criteria are used to define a sample (e.g., size).

An alert identifying module 313 of the alert type grouping manager 101 identifies alerts 305 in given samples of the security telemetry 301 generated by the triggering of signatures 311. It is to be understood that signatures 311 are maintained by a security vendor or the like as described above. In some embodiments, the set of signatures 311 is maintained by the provider of the alert type grouping manager 101 in the context of the provision of other security services. The signatures 311 themselves are not part of the security telemetry 301 itself, but are used in the context of analyzing the security telemetry 301. It is to be noted that security systems at the points of origination of the security telemetry 301 detect attempted attacks and other actions that trigger specific ones of the group of signatures 311 maintained by the security vendor, generating specific alerts 305. The generating of the alert 305 is logged at the point of origination, and included in the security telemetry 301. In other words, when an event, action, downloaded file or other indicator triggers a signature 311 on an endpoint or organizational entity collecting security telemetry 301, the trigger of the signature generates an alert 305 which is logged to the security telemetry 301. Because the alert identifying module 313 is analyzing massive security telemetry 301 from many points or origination, it is able to identify alerts 305 generated across a wide endpoint base. Such alerts 305 in the security telemetry 301 can contain data such as (i) identifiers and/or descriptions of the triggering signatures 311, identification of the alert-invoking sources 303 (e.g., the attacking machine's Internet Protocol (IP) address, domain and/or other identifying information) and (ii) an identifier of the reporting entity (e.g., the victim computer's IP address, machine ID, etc.).

Each alert 305 in the sample of security telemetry 301 being analyzed is identified, along with its source 303 and target. It is to be understood that individual alerts 305 are generated in response to the triggering of individual signatures 311. However, multiple signatures 311 can identify the same type of attack. In other words, twenty different signatures could identify twenty different known units of malicious code on a given computer 210, e.g., in an instance where an attack is uploading multiple malicious files. In some embodiments, the identification of alerts 305 in the sample of security telemetry 301 focuses on alert types, as opposed to specific alerts 305 indicating different actions of the same type. For example, the alert identifying module 313 could identify all alerts 305 of the type "suspicious port scanning" as opposed to the individual alerts 305 generated by the multiple signatures 311 indicative of different port scanning operations. Because the alerts 305 in the security telemetry 301 include an identification for the triggering signature 311, the alert type grouping manager 101 can match given triggering signatures to types. In some embodiments, the taxonomy of signatures 311 and their corresponding alerts 305 is performed by the security system outside of the operation of the alert type grouping manager 101. This information can then be stored, for example in conjunction with the group of signatures 311, and accessed by the alert type grouping manager 101. In other embodiments, an alert typing module 315 of the alert type grouping manager 101 classifies different alerts 305 into types. In either case, this typing can be updated as desired, and can be at any desired level of granularity. Some examples of alert types according to some embodiments are port scanning, Flash presence, browser type or plugin reconnaissance, fake anti-virus notification, fake add, one of multiple variations of a specific attack activity, SQL injection, attempted exploitation of a specific OS or network vulnerability, phishing attempt, detection of a non-trusted USB device, drive by shell code planting, suspicious file copying, presence of key logger, DDoS zombie spreading activity, etc. The specific types to utilize and the specific assignment of given alerts 305 to given types are variable design parameters, and can be adjusted as desired.

In addition to isolating a sample of the security telemetry 301 for analysis as described above, the alert type grouping manager 101 also filters the sample of security telemetry 301 to identify a subset most likely to be potentially relevant to the discovery of tuples 307. In one embodiment, a source filtering module 317 of the alert type grouping manager 101 filters out alerts 305 that were originated from sources 303 with private IP addresses. Thus, in this embodiment, only alerts 305 corresponding to attack sources 303 with public IP addresses are analyzed. This ensures reliable identification of those attack sources (e.g., hosts or networks) with public IP addresses, without risking that the dynamic allocation of private IP addresses (DHCP) blurs actions originating from many unrelated attack sources 303. For example, DHCP create such ambiguities by assigning the same private IP address (such as 172.16.0.1) to sources 303 in different companies. Multiple alerts 305 appearing to originate from the same private IP addressed source 303 could thus actually originate from multiple computers in multiple organizations. It is to be understood that attacks can also originate from sources 303 with private IP addresses (such as in the cases of worm spreading or insider threats). However, such attacks typically start from public IP address ranges. Thus, tuples 307 identifying such attacks can be discovered from analysis of attack sources 303 with public IP address. The discovered tuples 307 can subsequently be used to detect such attacks being launched from both public and private IP addressed sources 303, as described below.

In some embodiments, the source filtering module 317 filters sources 303 using other criteria, instead of or in addition to the public/private IP address filtering described above. For example, in one embodiment after filtering out sources 303 with private IP addresses, the other filtering can reduce the input volume of security telemetry 301 by identifying sources 303 adjudicated most statistically likely to be launching complex multipart attacks. For example, a source 303 attempting to launch a complex multipart attack typically attempts to launch diverse suspicious operations (e.g., port scanning, luring the user to click on a malicious URL through the launch of a fake anti-virus alert, attempting to exploit one or more specific OS holes, etc.). These different operations will trigger multiple signatures 311 which in turn will generate alerts 305 of different types. Thus, sources 303 that originate more types of alerts 305 (as opposed to more instances of a single alert type) are considered more likely to be launching complex attacks. In one embodiment, this can be quantified by counting the number of alert types originated by each sources 303. This information is in the telemetry 301 and can be gleaned by analysis thereof. For example, a hash set of triggered alert types can be associated with each source 303, and the set size tally per source 303 examined (this is just an implementation option for alert type counting utilized in a particular embodiment). Those sources 303 that do not meet a given threshold of generated alert types can then be filtered out. For example, the source filtering module 317 can establish a threshold T on the number of distinct types of alerts per candidate source 303 required to be adjudicated sufficiently likely of being a complex attack launching platform. All sources 303 in the set of telemetry 301 that do not meet T are then filtered out, keeping only those sources 303 that meet the threshold for further processing as described below. The specific threshold to use is a variable design parameter (e.g., two, four, seven).

The filtering stage is informed by properties/limitations of multipart attackers. First, attackers generally launch multiple types of attempted operations before succeeding to compromise a target. Different one of these attempts trigger different types of alerts. Secondly, attackers have limited infrastructure options (e.g., they can launch attacks from their own individual machines (naively), or coopt underground clouds/CDNs, or hide their attacks underneath legitimate looking services in limited public infrastructures (such as Amazon AWS). Ultimately, these two properties result in the sources 303 of complex multipart attacks raising more diversified sets of alert types than other sources 303. Leveraging this, the source filtering module 717 optimizes selection of candidate attack sources 303, by filtering out those that generate fewer alert types. It is to be further understood that in addition to reducing the size and increasing the relevance of the telemetry 301, pre-filtering of sources 303 to those must likely to be perpetrating complex attacks aids the alert type grouping manager 101 in identifying tuples 307 without regard to timespans and ordering of their multiple alert types. This is true because attack sources 303 launch various attempted operations at different targets at different times and in different orders. However, analysis of alerts 305 triggered at many points of origination by a smaller subset of potentially malicious sources 303 enables identification of the patterns of entire exploit trials, without having to wait for each stage of the multipart attack to reveal itself over a long time interval in a specific order, for example by observing alerts 305 generated by a ratio of too many sources 303 to too few targets.

In other embodiments, other filters can be employed on the candidate sources 303 in the security telemetry 301 in addition to (or instead) of those described above. For example, the source filtering module 317 can also include auxiliary counting metrics in order to identify a subset of suspicious sources 303 more confidently. Such auxiliary counting can include the numbers of targets per source 303, the total number of alerts 305 of any type per source 303, etc. Also, different signatures 311 can be weighted higher or lower, for example based on confidence in the signature 311 identifying a bona fide attack versus merely suspicious activity, etc.

Those sources 303 that remain after the filtering stage are referred to herein as pre-filtered sources 303. Following the filtering, a tuple discovering module 319 of the alert type grouping manager 101 examines the alert types generated by activities of the pre-filtered sources 303, in the sample of security telemetry 301, in order to discover tuples 307 that identify complex attacks. In other words, the tuples 307 are derived from alert 305 generating activities of pre-filtered (i.e., potentially interesting) attack sources 303. To this end, the tuple discovering module 319 examines the specific alert types generated by the pre-filtered sources 303, to identify pairs, triplets, quadruplets and so on of alert types wherein each type was generated by a common pre-filtered source 303 (or more than one). Such groupings of alert types are potential tuples 307. More specifically, where two alert types (e.g., type i and type j) are identified as having been triggered in the telemetry 301 by at least one common pre-filtered source 303, alert type i and type j are identified as a grouped pair. The more sources 303 that are identified as having independently triggered both alerts types of the pair, the higher the confidence level that the pair is a bona fide tuple 307 identifying a multipart attack, as opposed to two alert types that happen to have been incidentally generated by a common source 303. Once pairs are identified, additional passes through the relevant data from the telemetry 301 can be made to identify triplets, quadruplets and so on. How many alert types in a group are required to classify the group as a tuple 307 is a variable design parameter (e.g., two, three, five, etc.). Likewise, how many common sources 303 per type are required to classify a group as a tuple 307 is also a variable design parameter, which can be as few as one or can be greater than one, and can be inversely proportional to the size of the group (e.g., larger groups of alert types require fewer sources 303 in common to be classified as tuples 307). In addition, where more common sources 303 per alert type than are required to classify a group as a tuple 307 are present, a quantification of the confidence level in the tuple 307 can be increased. In general, the confidence level assigned to a tuple 307 is a quantification of an assessed likelihood that the tuple 307 accurately identifies a multipart attack.

In one embodiment, the alert type grouping manager 101 identifies groups of alert types with common pre-filtered sources 303 by conducting an iterative multi-pass search of a list of alert types generated by pre-filtered sources 303, sorted according to the number of separate pre-filtered sources 303 that generated the alert type. In this embodiment, the alert type grouping manager 101 sorts all alert types generated by at least one pre-filtered source 303, based on the number of pre-filtered sources 303 that generated the given alert type. More specifically, for each alert type $A_1$ to $A_n$ that was generated by at least one pre-filtered source S, an object or other structure (e.g., a record, an entry in a multidimensional array, etc.) can be created containing the alert type, the number of pre-filtered sources 303 that generated that alert type, and the set of specific pre-filtered sources 303 that generated that alert type. The specific implementation mechanics of the data structures is a variable design parameter. Note that the object data (alert types, number and identity of corresponding pre-filtered sources 303) can be identified in the sample of security telemetry 301, and in some embodiments the objects do not contain the actual data but instead references to it, or method(s) for obtaining it, or the like.

A list of these alert type objects (e.g., a list of pointers to the objects) is created and sorted according to the number of pre-filtered sources 303 that generated the alert type, e.g., from most to least. This sorting can be done, for example, according to the pseudo-code show in Table 1:

TABLE 1

S = PreFiltered_Attack_Sources_List( )
S = list.load(<prefiltered_attack_source, set{alert_types}>)
T = Alerts_Per_Source_List( )
T = list.transform(S) /* = list(<alert_type, set{prefiltered_attack_sources}>) */
A = Interesting_Alerts_List( )
for alert in T:
   A[<alert, set{prefiltered_attack_sources }>] =
     = size(alert.set{prefiltered_attack_sources })
AS = A. decreasing_sort( )

In this embodiment, based on the sorted alert type list, the alert type grouping manager 101 proceeds to identify alert type pairs generated by one or more common sources 303. For example, by examining the sorted list from alert types generated by the most pre-filtered sources 303, suppose alert type $A_1$ was generated by 123 sources and alert type $A_2$ was generated by 99 sources (these numbers are just examples). The specific pre-filtered sources 303 that generated these alert types are then examined, looking for one or more intersections. In other words, it is determined whether there is at least one common source 303 that triggered both alert types $A_1$ and $A_2$. If there is at least one common source 303, a pair has been discovered, and the number and identifiers of common sources 303 are noted for the next pass. If there are no common sources 303, these two alert types are not a pair, and it is further concluded that no groupings larger than two can be built on top of these two alert types. In other words, since the two alert types have no common source, no grouped triplet or larger grouping of alert types with at least one common source 303 can contain these two alert types. The same analysis can be applied to each potential pair of alert types in the list.

In one embodiment, the discovery of alert type pairs using the sorted alert list AS can be implemented, for example, according to the pseudo-code show in Table 2, which uses the same notation and data structures defined in Table 1:

TABLE 2

Pairs = Interesting_AlertPairs_List( )
for i in AS:
   for j in AS.sublist(ord(i), len(AS)):
      ts = intersection(i.set{prefiltered_attack_sources},
      j.set{prefiltered_attack_sources})
      if ts.not_empty( ):
         Pairs[<i, j , ts>] = size(ts)

In the pseudo-code of Table 2, AS.ord(i) is a position of alert type i in the list AS, while len(AS) is the length of the list AS. In the specific example algorithm shown, each discovered pair (i, j) is recorded by keeping a reference of alert type identifier i, alert type identifier j, the set of attack sources 303 which triggered both alert types, and a core confidence measure corresponding in this case to the size of that set.

Figure 4:
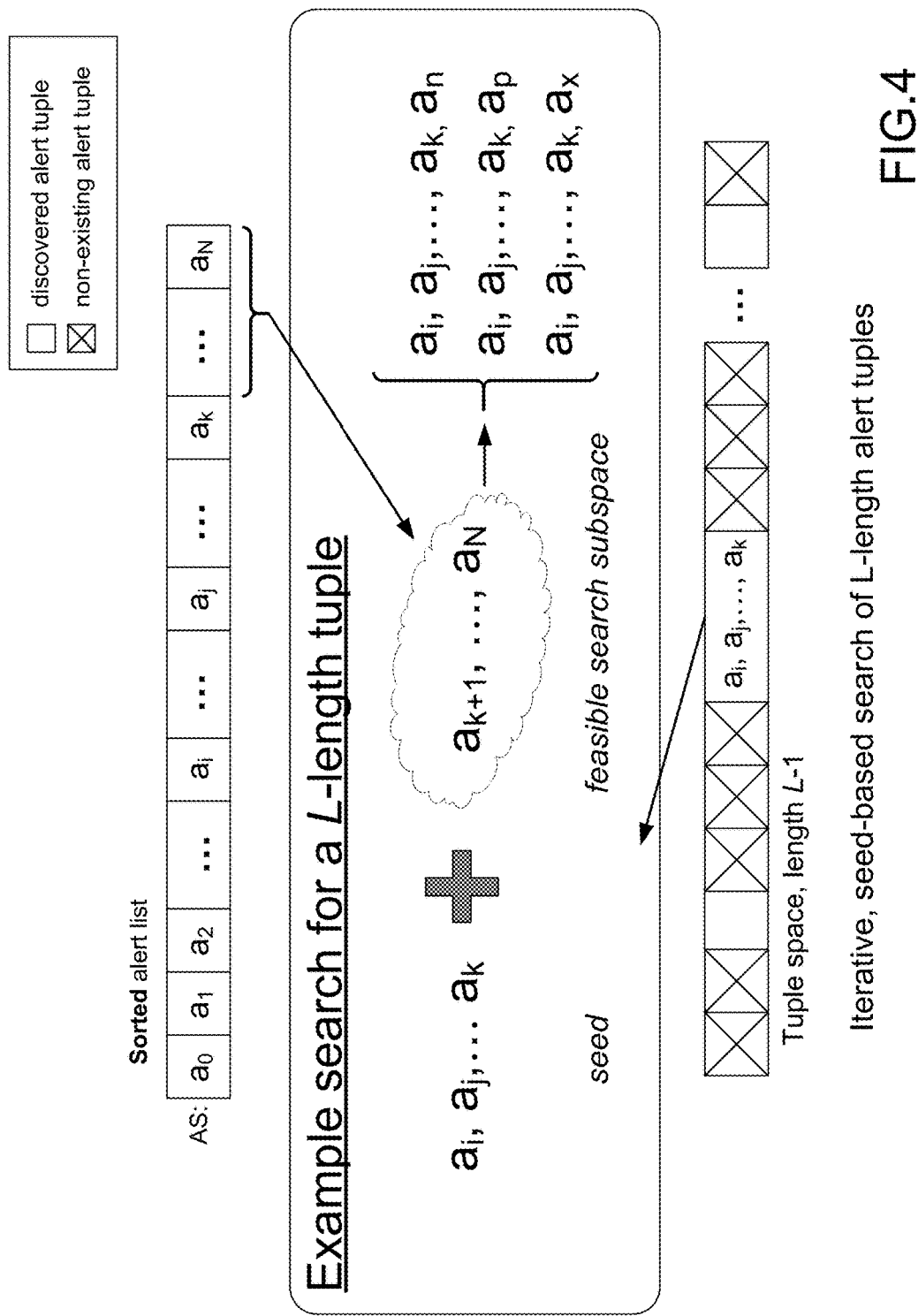
FIG. 4 illustrates an alert type grouping manager iteratively searching for groupings of successively more alert types, according to one embodiment.

Next, the alert type grouping manager 101 iteratively proceeds to discovery of alert type triplets, i.e., groupings of three alert types triggered by one or more common source 303. Several facts resulting from the previous iteration can be used to optimize this pass. Specifically, when looking for grouped pairs of alert types, it could be the case that many potential pairs of alert types are not in fact generated by any common attack sources 303. Based on this alone, it is not necessary to exhaustively search the whole space of individual alert types for grouped triplets (and in fact searching that space for alert triplets would be computationally expensive, being exponentially more processing intensive than searching for alert type pairs). However, it is sufficient to search only for grouped triplets that are seeded in the discovered alert type pairs. In other words, if a potential pair of alert types $A_x$ and $A_y$ does not have any pre-filtered sources 303 in common (i.e., is not a grouped pair), it is not possible that any grouped triplets contain that pair of alert types. Only those pairs of alert types that are actually triggered by at least one common source 303 need to be processed to determine whether they form two members of a triplet. Second, the analysis of a discovered grouped pair to determine whether it is a seed of a grouped triplet can be significantly optimized by the presence of the sorted list AS. For a seed alert type pair (i, j), alert types (e.g., k) that can be potentially added to the pair to form a grouped triplet will only be found in that part of the list AS positioned after the alert type j, where AS.ord(i)<AS.ord(j) and AS.ord(j)<AS.ord(k). This significantly reduces the search space. FIG. 4 illustrates an iterative seed group based tuple search according to one embodiment. This process can be described, for example, according to the pseudo-code show in Table 3:

TABLE 3

```
Triplets = Interesting_AlertTripls_List( )
for (i,j) in Pairs:
    for k in AS.sublist(ord(j), len(AS)):
        ts = intersection((i,j).set{prefiltered_attack_sources},
        k.set{prefiltered_attack_sources})
        if ts.not_empty( ):
            Triplets [<i, j , k, ts>] = size(ts)
```

Similarly to grouped pairs, discovered alert type triplets consist of alert types identifiers (e.g., i, j and k), the set of attack sources 303 which triggered all three alert types, and the core confidence measure corresponding in this case to the size of that set.

The alert type grouping manager 101 can proceed iteratively to discover successively longer alert type groupings, for example using additional passes of the above-described optimized search functionality. For example, quadruplets such as (i, j, k, l) could be discovered by considering identified seed triplets (i, j, k) and looking at alert types only in the part of the list AS following the position of alert k.

Iterative discovery of increasingly larger groupings can be stopped according to different criteria in different embodiments and under different circumstances. In one embodiment, iteration can terminate at a maximum length value set by a vendor or system administrator or the like. For example, it could be administratively determined to discover alert type grouping only up to some length k (i.e., find tuples such as (a1, a2, a3, . . . , ak)). The iterative searching can also be terminated at a length at which it is dynamically determined that instances of groups (or groups with requisite confidence levels) are sufficiently rare. As noted above, how many alert types in a group according to what confidence level results in classification of the grouped alert types as a tuple 307 is a variable design parameter.

By executing the functionality described above, a collection of tuples 307 is created. A tuple storing module 321 of the alert type grouping manager 101 can be store the tuples, for example in a repository 321 or other suitable mechanism, along with relevant attributes, such as confidence levels, affected population sizes, spans of attacks sources 303, etc. The above-described process of tuple discovery can be executed periodically, continually, or on-demand as desired. In one embodiment, the alert type grouping manager 101 continually analyzes new security telemetry 301 as it is received, and continually discovers tuples by analyzing current sets of received security telemetry 301.

Once discovered, tuples 307 can be deployed and utilized in a number of ways. For example, tuples 307 can be distributed to endpoint computers 210 and organizations for use in the detection of and protection against complex multipart attacks. At the endpoint level, a tuple 307 can serve as a type of an advanced security signature which identifies a complex, multipart attack. As such, tuples 307 can be regularly updated by the centralized security provider 501, as new ones are discovered and old ones are superseded. In this context, endpoint (and organization) level computer security programs can utilize tuples 307 for full attack comprehension, e.g., for attack prediction and for backtracking exposures to vulnerabilities, as described in more detail below.

Tuples 307 can also be utilized by a centralized provider of security services 501 (e.g., a commercial security services vendor). When employed by the centralized security services provider 501, tuples 307 enable various security analytics, such as identification of targeted attacks, detection of attack variations and evasive actions, spread of attacks, identification of launching infrastructures, etc.

Figure 5:
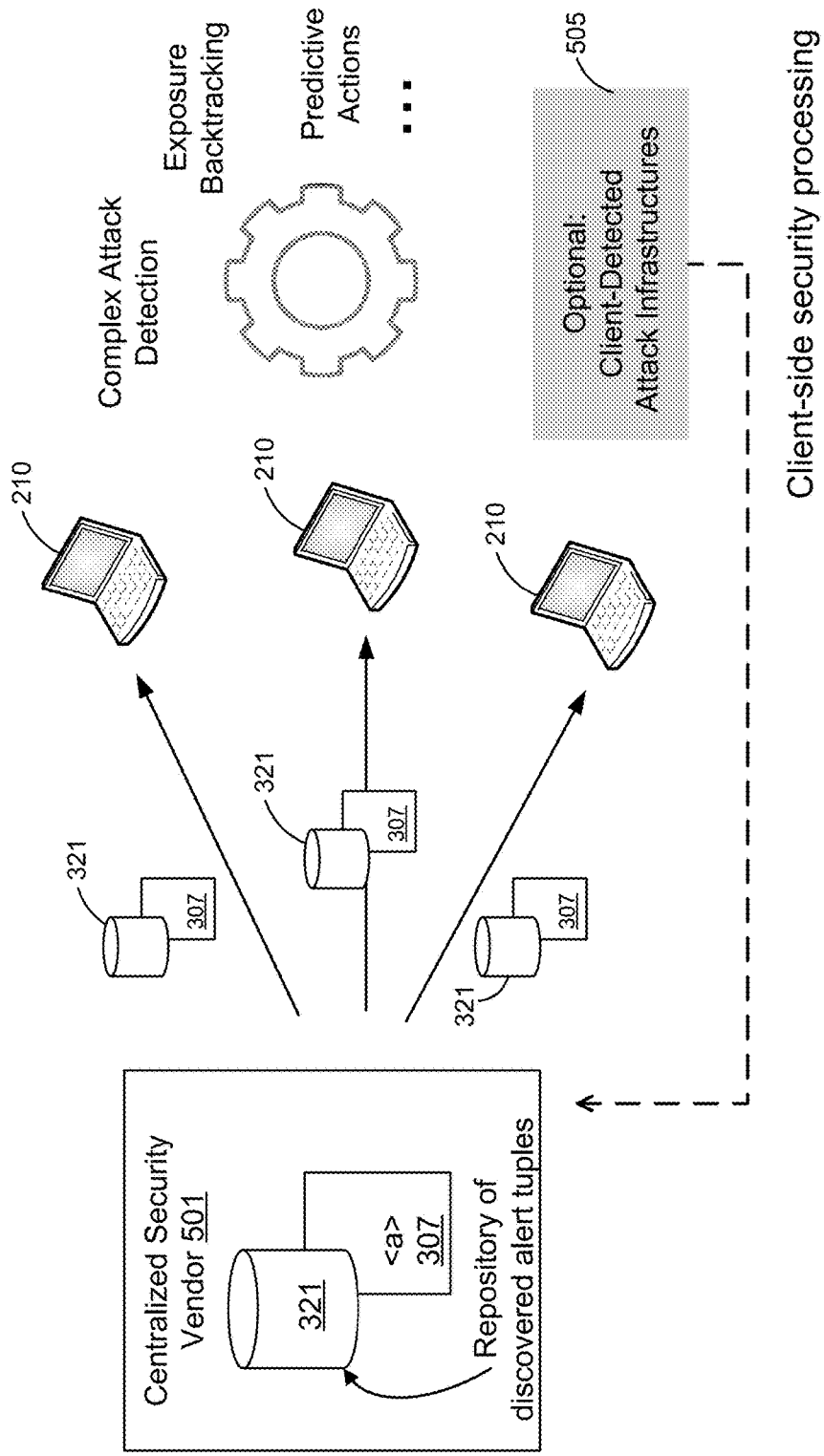
FIG. 5 illustrates deployment of tuples to multiple endpoint computers, and the use of tuples to discover and manage complex multipart attacks, according to some embodiments.

FIG. 5 illustrates deployment of a tuple repository 321 to multiple endpoint computers 210, where the tuples 307 and relevant statistical information therein can be used to discover complex attacks and their exploit arsenals and methodologies, according to some embodiments. In FIG. 5, a centralized provider of security services 501 deploys the repository 321 of discovered tuples to the endpoint level security programs on multiple endpoint computers 210. As explained above, the tuples 307 identify the footprints of complex multipart attacks, irrespective of time span or sequencing. Thus, detection of a specific attack within the tuple 307 can be indicative of previously exploited resources on the endpoint computer 210 that may require corrective measures, as well as possible future exploits to protect against. For example, suppose a given tuple 307 indicates a multipart attack that consists of a fake antivirus advertisement, a reconnaissance of browser plugins, a suspicious JAR download and a backdoor Trojan activity. In the tuple 307 that identifies this complex attack, the first alert corresponds to a high confidence signature 311, but the last three correspond to low-confidence signatures 311. Without the discovery and use of the tuple 307, the last three alerts would not even be considered in a production environment. Thus, hence the holistic view of this complex multipart attack would be lost, and instead only a single security incident would be flagged, the fake antivirus advertisement. However, the discovered tuple 307 reveals: (i) the complete footprint of the complex attack (tying together all the corresponding alert types), (ii) an indicative confidence score for the tuple 307 as a whole as opposed to the alerts in isolation, (iii) the affected resources (e.g., browser plugins), (iv) the attack means (e.g., malicious Java code and possible Trojan backdoor), and (v) the culprit infrastructures and domains that launched the attack.

Once discovered, tuples 307 can facilitate complete attack comprehension on any computer 210, even across different enterprises or user populations, for multipart attacks originating from any source 303, not only those pre-filtered sources 303 used to discover the tuples 307. For example, although sources 303 with private IP addresses can be filtered out in the processes of tuple 307 discovery as described above, discovered tuples 307 can still be used to identify complex attacks originating from sources 303 with private IP addresses, or any from any other sources 303. It is to be noted that in some embodiments, tuples 307 may be applied such that each alert 305 need not originate from a single source 303 in order to identify the complex attack (i.e., the attack sources 303 can be distributed).

Figure 6:
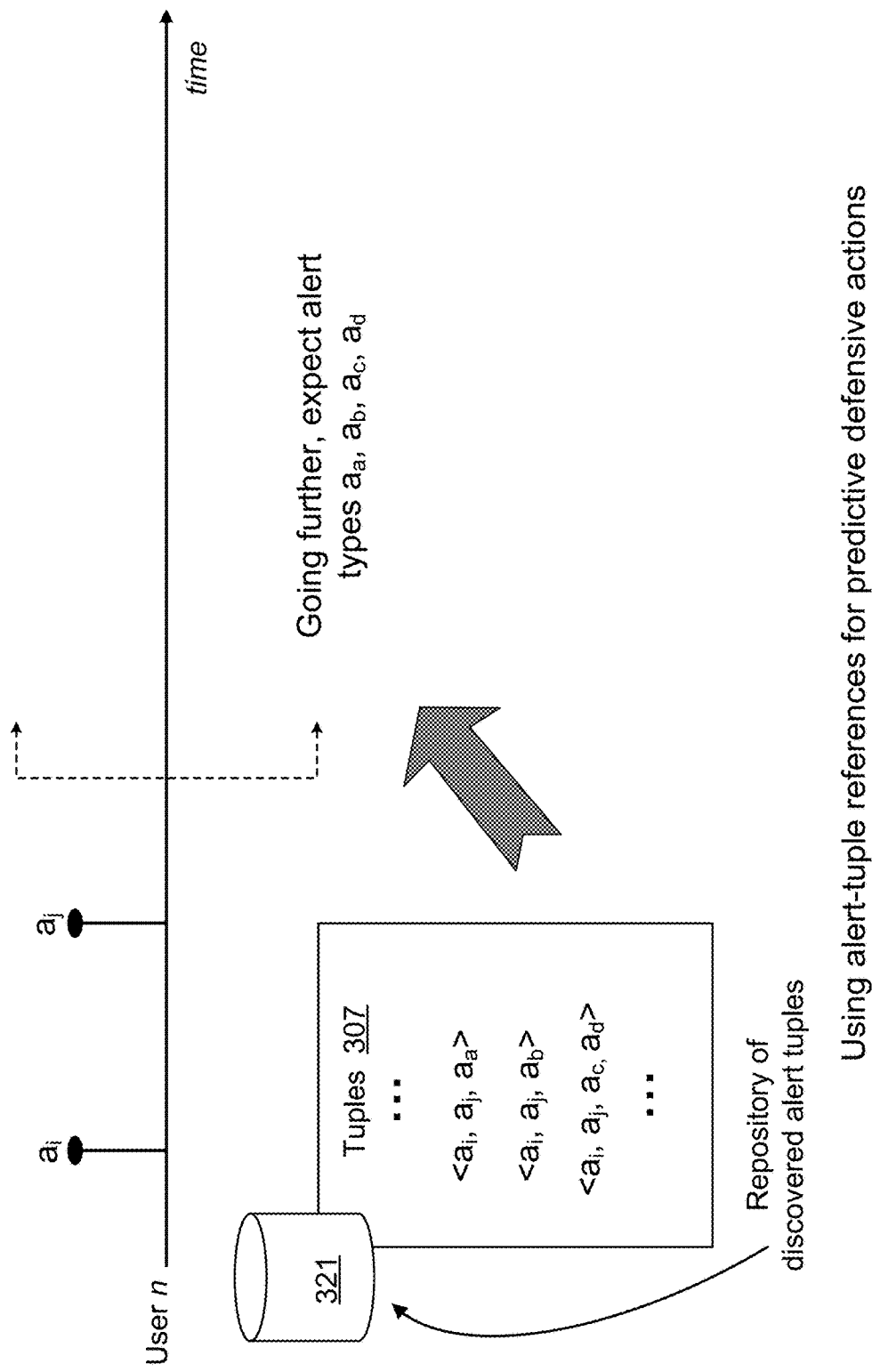
FIG. 6 illustrates use of tuples for predictive defensive actions, according to some embodiments.

Tuples 307 can be thought of as high-level signatures for complex multipart attacks. Thus, if the security program on an attacked endpoint 210 identifies a tuple 307, say (a_p, a_q, a_r), in its alert history, it can confidently suspect it has been exposed to the corresponding multifaceted attack. An endpoint level security program that detects a single alert can refer to the tuple repository 321 and predict the most likely next alert types. This is particularly useful at times when hosts are just becoming exposed to unclear exploit trials, i.e., in cases where initially triggered alert types are only suspicious (such as the low-confidence alerts about plugin reconnaissance), but discovered to be regularly followed by truly malicious alerts (such as redirection to malware hosting domains). FIG. 6 illustrates an example of this scenario according to one embodiment. In the example of FIG. 6, having detected occurrence on a given endpoint 210 of one or more components of the multipart attack (e.g., $a_i$, $a_j$) identified by one or more tuples 307, the endpoint security program can predict the other components of the multipart attack(s) that are to be expected (e.g., $a_a$, $a_b$, $a_c$, $a_d$), and take countermeasures against them. As another clarifying example, suppose an endpoint level security program detects alerts a_p and a_q in its security events. By examining the tuple repository 321, the program can discover that this pair of alerts is more likely associated with alerts (a_x, a_y, a_z) as confirmed for attack-source population S_a, as compared to alerts (a_r, a_s) confirmed by the population S_b. This enables the endpoint level security program to prepare suitable measures against all or the most likely unfolding alerts (e.g., as indicated by population sizes S_a>S_b).

By the same measure, backtracking can be applied, to check for the previous occurrence of the other components of a multipart attack, and disinfect or otherwise protect against malicious actions taken by attack components that have already occurred. For example, where a given alert indicates the presence of a malicious binary, the binary can be removed. But where the given alert is part of a tuple 307 identifying a multipart attack, the tuple 307 could also indicate, for example, that the malicious binary likely came through a Trojan backdoor. Viewing the alert in isolation, the binary would be removed but the backdoor would remain open for any new (possibly re-packaged) malicious binaries that may not even be identified by existing security signatures. However, the security program 305 can leverage the tuple 307 which indicates that the malicious binary is one component of a multipart attack that uses the given backdoor, and thus checks for and eliminates the backdoor when the malicious binary is detected. This is just one example of using the identification of one or more of the multiple alerts in a tuple 307 describing a complex attack to verify whether all possible previous exploit stages have been sanitized or otherwise properly addressed when one component is detected. By examining tuples 307 containing the identified component(s), all resources that have been potentially exploited on targeted computers 210 can be addressed, such as spuriously opened service sockets, Java implementation, misconfigured interfaces, etc. In general, security programs on victimized endpoints 210 can backtrack through all of their alert history, and determine whether any of the newly learned/updated tuples 307 can be found there. If so, the program can assess how the alerts of the given tuple 307 were handled, and take additional corrective action where appropriate.

In addition, endpoints 210 can optionally report alert telemetry 505 (e.g., the sources 303 of these alerts 305 and any other relevant information) back to the centralized security services provider 501, thereby assisting with the identification of new attack-sourcing infrastructures. The centralized security services provider 501 can in turn provide updates concerning attack infrastructures discovered by individual endpoints 210 to the rest of its (e.g., customer) base, in order to provide collaborative attack protection.

Figure 7:
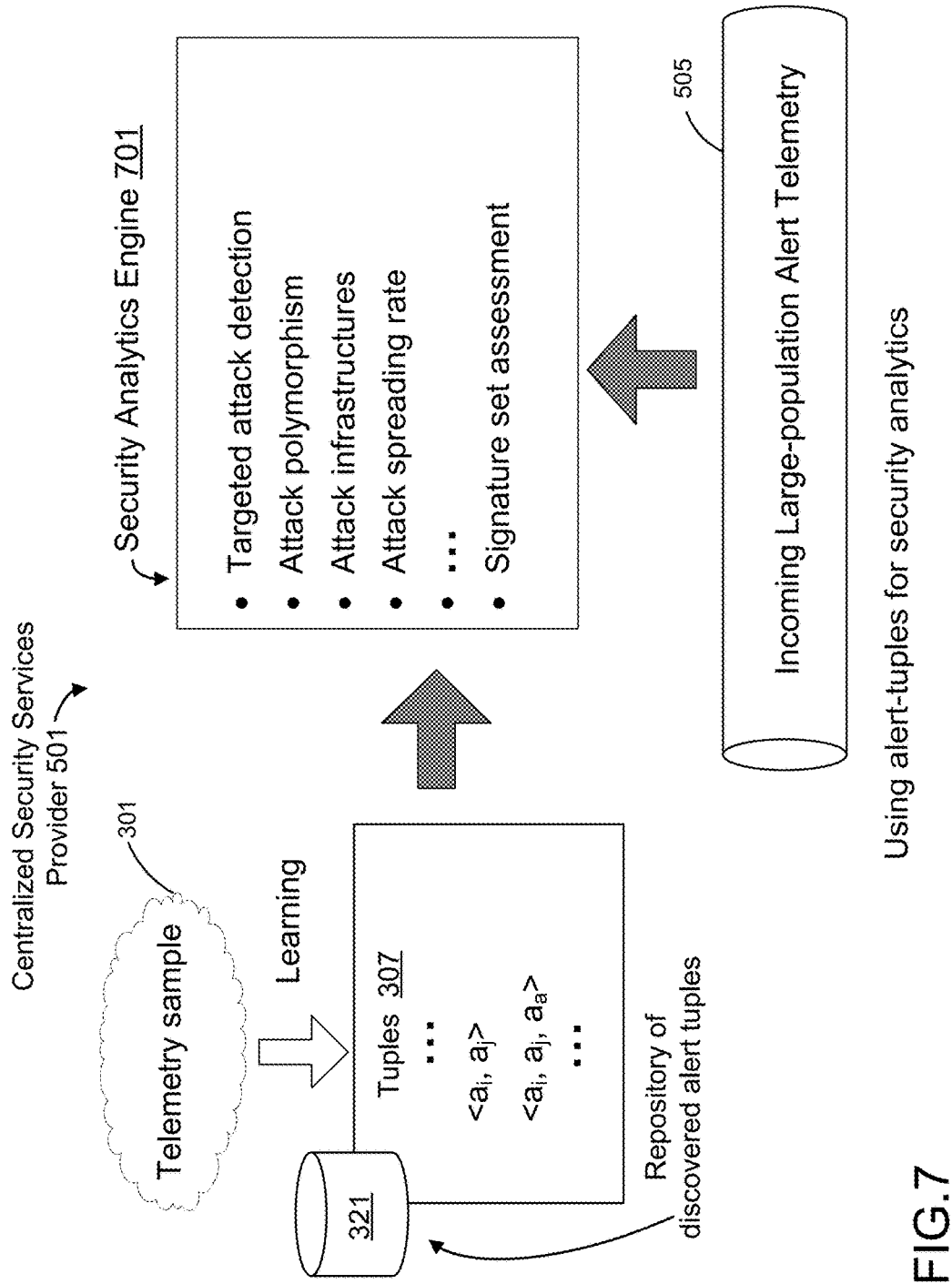
FIG. 7 illustrates a centralized provider of security services performing tuple based analytics, according to some embodiments.

Turning now to FIG. 7, an analytics engine 701 can run in conjunction with the centralized security services provider 501 and perform tuple based security analytics, on both tuple repositories 321 gleaned from processing samples of security telemetry 301, as well as alert telemetry 505 received from a large user base. In some embodiments, the analytics engine 701 can be implemented in the form of a component of the alert type grouping manager 101. Tuple analytics can take different forms in different embodiments. For example, by comparing similarities and sources 303 of multiple discovered tuples 307 (i.e., complex attack footprints), the analytics engine 701 can assess and adjudicate whether they are variations of the same attack. These determinations can then be used to update the tuple repository 321, which can be distributed to the user base periodically, when updated and/or on demand. Discussing identification of attack variations in more detail, suppose the analytics engine identifies the two alert tuples (a_p, a_x, a_y, a_z) and (a_q, a_x, a_y, a_z) in the repository 321. From this, the analytics engine 701 could infer that these are two similar versions of a single complex attack. The specific criteria used for making such adjudications can vary between embodiments. In some embodiments, similarities between tuples 307 are analyzed according to a given similarity threshold per tuple length. For example, tuples 307 comprising alert triplets can be adjudicated "likely similar" if at least two of the alert types match (e.g., a similarity threshold of two for tuples 307 with a length of three). Additionally, identifying a growing or threshold number of such "likely similar" tuples 307 in the telemetry could be used to identify active multipart polymorphic attacks.

The analytics engine 701 can also identify complex attacks that are specifically targeted at given industries or organization types. Discovered alert tuples 307 reveal entire attack footprints instead of just atomic security issues. Thus, by looking at the various computers 210 exposed to a particular alert pattern, the analytics engine can assess specific targeting demographics of complex attacks. For example, seeing a specific tuple (a_x, a_y, a_z, a_w) in the alert telemetry 505 of only a limited number of hosts or enterprises clustered in a given industry or type of organization is indicative of targeting. Using this type of analysis, the specific targets of given complex multipart attacks can be identified, such as attacks focused on particular targets, e.g., financial institutions, medical service providers, specific government departments, military installations, IT companies, etc. The analytics engine 701 can also can derive statistics concerning multipart attacks, such as the number of infected hosts or enterprises, assess the growth potential of each complex attack, identify diverse infrastructures that freshly join attack hosting, etc.

Additionally, tuple analytics can be used by security service providers 501 to assess their collections of signatures 311. As noted above, some signatures 311 are thoroughly verified and others are less indicative or experimental. It is often desirable to further assess whether such experimental signatures 311 are reliable, i.e., pointing to actual malicious activities. To that end, tuples 307 can provide several useful confidence metrics for signature assessment. The first metric is derived from tuple 307 internals, according to which the analytics engine 701 looks for alert types generated by experimental signatures 311 that generally appear in tuples 307 dominated by alert types generated by verified signatures 311. More specifically, the analytics engine 701 can identify "mostly verified" type tuples 307 based on a given threshold, taking into account the length of the tuple 307, e.g., X verified alert types inside a Y length tuple 307. The analytics engine 701 next determines how many different "mostly verified" tuples 307 contain a particular "experimental" alert type. Again a given threshold can be employed. Finally, "experimental" alert types that pass both criteria of being detected in a threshold number of "mostly verified" tuples 307 can be automatically adjudicated as verified.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for discovering groupings of security alerts identifying corresponding complex, multipart attacks, from analysis of security telemetry received from multiple endpoint computing devices, the method comprising:
   receiving collected security telemetry, by a centralized computing system, from a plurality of endpoint computing devices on which attacks occur, the collected security telemetry including a plurality of samples collected on the plurality of endpoint computing devices responsive to detecting by the plurality of endpoint computing devices, one or more attacks from at least one invoking source computing device on which the one or more attacks originate, wherein the plurality of endpoint computing devices and the at least one invoking source computing device are different computing devices;
   identifying alerts in a given sample of the received security telemetry, by the centralized computing system, each specific identified alert having been generated by a triggering signature on a specific one of the plurality of endpoint computing devices, each specific alert containing at least an identifier of the triggering signature, an identifier of a corresponding invoking source computing device, and an identifier of the specific one of the plurality of endpoint computing devices on which the specific identified alert was generated;
   filtering invoking source computing devices of the identified alerts, by the centralized computing system, into a subset of alerts with filtered invoking source computing devices determined to meet at least one condition;
   discovering tuples identifying multipart attacks, by the centralized computing system, by examining the subset of alerts with filtered invoking source computing devices and identifying groupings of multiple alerts generated by at least one common filtered invoking source computing device, wherein a tuple comprises an identified grouping of alert types representative of diverse suspicious operations associated with a specific multipart attack; and
   utilizing the tuples for security analytics comprising one or more of:
      identifying targeted attacks against organizations associated with the plurality of endpoint computing devices;
      detecting multiple variations of specific multipart attacks; and
      identifying one or more attack launching infrastructures associated with the tuples.

2. The method of claim 1 wherein receiving collected security telemetry from a plurality of endpoint computing devices further comprises:
   periodically receiving updated security telemetry from participating endpoint computing devices.

3. The method of claim 1 wherein receiving collected security telemetry from a plurality of endpoint computing devices further comprises:
   receiving collected security telemetry from more than a thousand separate participating endpoint computing devices.

4. The method of claim 1 wherein identifying alerts in a given sample of the received security telemetry further comprises:
   identifying alerts of given types in the given sample of the received security telemetry.

5. The method of claim 1 wherein filtering invoking source computing devices of the identified alerts further comprises:
   filtering out invoking source computing devices with private Internet Protocol addresses, resulting in a subset of only those alerts with invoking source computing devices with public Internet Protocol addresses.

6. The method of claim 1 wherein filtering invoking source computing devices of the identified alerts further comprises:
   filtering out invoking source computing devices that do not meet a given threshold number of generated alert types, resulting in a subset of only those alerts that have invoking source computing devices that do meet the given threshold number of generated alert types.

7. The method of claim 1 wherein filtering invoking source computing devices of the identified alerts further comprises:
   filtering out invoking source computing devices that do not generate alerts on a given threshold number of targeted endpoint computing devices, resulting in a subset of only those alerts that have invoking source computing devices that do generate alerts on the given threshold number of targeted endpoint computing devices.

8. The method of claim 1 wherein filtering invoking source computing devices of the identified alerts further comprises:
   filtering out invoking source computing devices that do not meet a given threshold number of total generated alerts, resulting in a subset of only those alerts that have invoking source computing devices that do meet the given threshold number of total generated alerts.

9. The method of claim 1 wherein discovering tuples identifying multipart attacks further comprises:
   identifying a grouping of alert types in the subset of alerts with filtered invoking source computing devices, the identified grouping comprising multiple alert types generated by at least one common invoking source computing device;
   adjudicating the identified grouping to be a tuple identifying a multipart attack; and
   assigning a confidence level to the tuple, the confidence level quantifying an assessed likelihood that the identification of the multipart attack by the tuple is accurate.

10. The method of claim 1 wherein discovering tuples identifying multipart attacks further comprises:
    assigning confidence levels to the discovered tuples, based on at least one of: number of alert types, number of common invoking source computing devices and confidence levels in triggering signatures.

11. The method of claim 1 wherein discovering tuples identifying multipart attacks by examining the subset of alerts with filtered invoking source computing devices and identifying groupings of multiple alerts generated by at least one common invoking source computing device further comprises:
    conducting an iterative multi-pass search of alert types generated by filtered invoking source computing devices;
    during each pass of the iterative multi-pass search, identifying groups of successively larger numbers of alert types generated by at least one common invoking source computing device; and
    adjudicating at least one identified group of alert types generated by at least one common invoking source computing device as a tuple that identifies a multipart attack.

12. The method of claim 1 wherein discovering tuples identifying multipart attacks by examining the subset of alerts with filtered invoking source computing devices and identifying groupings of multiple alerts generated by at least one common invoking source computing device further comprises:
    sorting a list of alert types generated by filtered invoking source computing devices, according to a number of filtered invoking source computing devices that generated each alert type from most to least;
    identifying groupings of alert types with multiple common invoking source computing devices, by traversing the sorted list of alerts types going from most invoking source computing devices to least;
    iteratively traversing the sorted list identifying successive additional alert types to add to previously identified groupings, using previously identified groupings of alert types as seed groups for successive identifications, wherein only a portion of the sorted list appearing after the last added alert type is examined for successive identifications.

13. The method of claim 1 wherein discovering a tuple further comprises:
    discovering a tuple containing at least one alert type triggered by a verified signature and at least one alert type triggered by an experimental signature.

14. The method of claim 1 further comprising:
    providing discovered alert tuples to a plurality of endpoint computing devices where tuples are utilized to predict and defend against suspected future occurrence of components of detected multipart attacks.

15. The method of claim 1 further comprising:
    providing discovered alert tuples to a plurality of endpoint computing devices where tuples are utilized to identify previously executed components of detected multipart attacks and take corresponding corrective action.

16. The method of claim 1 further comprising:
    adjusting confidence levels in experimental signatures indicative of individual alerts, by performing security analytics on multiple discovered tuples.

17. At least one non-transitory computer readable medium for discovering groupings of security alerts identifying corresponding complex, multipart attacks, from analysis of security telemetry received from multiple endpoint computing devices, the at least one non-transitory computer readable medium storing computer executable instructions that, when loaded into computer memory and executed by at least one processor of at least one centralized computing device, cause the at least one centralized computing device to perform the following steps:
    receiving collected security telemetry from a plurality of endpoint computing devices on which attacks occur, the collected security telemetry including a plurality of samples collected on the plurality of endpoint computing devices responsive to detecting by the plurality of endpoint computing devices, one or more attacks from at least one invoking source computing device on which the one or more attacks originate, wherein the plurality of endpoint computing devices and the at least one invoking source computing device computing device are different computing devices;
    identifying alerts in a given sample of the received security telemetry, each specific identified alert having been generated by a triggering signature on a specific one of the plurality of endpoint computing devices, each specific alert containing at least an identifier of the triggering signature, an identifier of a corresponding invoking source computing device, and an identifier of the specific one of the plurality of endpoint computing devices on which the specific identified alert was generated;

filtering invoking source computing devices of the identified alerts into a subset of alerts with filtered invoking source computing devices determined to meet at least one condition;

discovering tuples identifying multipart attacks, by examining the subset of alerts with filtered invoking source computing devices and identifying groupings of multiple alerts generated by at least one common filtered invoking source computing device, wherein a tuple comprises an identified grouping of alert types representative of diverse suspicious operations associated with a specific multipart attack; and utilizing the tuples for security analytics comprising one or more of:
  identifying targeted attacks against organizations associated with the plurality of endpoint computing devices;
  detecting multiple variations of specific multipart attacks; and
  identifying one or more attack launching infrastructures associated with the tuples.

18. A centralized computing system for discovering groupings of security alerts identifying corresponding complex, multipart attacks, from analysis of security telemetry received from multiple endpoint computing devices, the centralized computing system comprising:

a processor;

system memory;

a receiving module residing in the system memory, the receiving module being programmed to receive collected security telemetry from a plurality of endpoint computing devices on which attacks occur, the collected security telemetry including a plurality of samples collected on the plurality of endpoint computing devices responsive to detecting by the plurality of endpoint computing devices, one or more attacks from at least one invoking source computing device on which the one or more attacks originate, wherein the plurality of endpoint computing devices and the at least one invoking source computing device are different computing devices;

an alert identifying module residing in the system memory, the alert identifying module being programmed to identify alerts in a given sample of the received security telemetry, each specific identified alert having been generated by a triggering signature on a specific one of the plurality of endpoint computing devices, each specific alert containing at least an identifier of the triggering signature, an identifier of a corresponding invoking source computing device, and an identifier of the specific one of the plurality of endpoint computing devices on which the specific identified alert was generated;

an invoking source filtering module residing in the system memory, the invoking source filtering module being programmed to filter invoking source computing devices of the identified alerts resulting in a subset of alerts with filtered invoking source computing devices determined to meet at least one condition;

a tuple discovering module residing in the system memory, the tuple discovering module being programmed to discover tuples identifying multipart attacks, by examining the subset of alerts with filtered invoking source computing devices and identifying groupings of multiple alerts generated by at least one common filtered invoking source computing device, wherein a tuple comprises an identified grouping of alert types representative of diverse suspicious operations associated with a specific multipart attack; and utilizing the tuples for security analytics comprising one or more of:
  identifying targeted attacks against organizations associated with the plurality of endpoint computing devices;
  detecting multiple variations of specific multipart attacks; and
  identifying one or more attack launching infrastructures associated with the tuples.

* * * * *